(12) United States Patent
Ishikawa et al.

(10) Patent No.: US 9,283,520 B2
(45) Date of Patent: Mar. 15, 2016

(54) EXHAUST GAS TREATMENT APPARATUS

(75) Inventors: Kanji Ishikawa, Kure (JP); Masaaki Ishioka, Kure (JP); Katsuhiro Yashiro, Kure (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 317 days.

(21) Appl. No.: 13/990,057

(22) PCT Filed: Nov. 28, 2011

(86) PCT No.: PCT/JP2011/077338
§ 371 (c)(1), (2), (4) Date: Jul. 23, 2013

(87) PCT Pub. No.: WO2012/073873
PCT Pub. Date: Jun. 7, 2012

(65) Prior Publication Data
US 2013/0287639 A1    Oct. 31, 2013

(30) Foreign Application Priority Data

Nov. 29, 2010 (JP) ................. 2010-265144

(51) Int. Cl.
| | |
|---|---|
| *B01D 50/00* | (2006.01) |
| *B01D 53/94* | (2006.01) |
| *B01D 53/86* | (2006.01) |
| *B03C 3/017* | (2006.01) |
| *F23J 15/02* | (2006.01) |

(52) U.S. Cl.
CPC ........ *B01D 53/9418* (2013.01); *B01D 53/8631* (2013.01); *B03C 3/017* (2013.01); *F23J 15/02* (2013.01); *B01D 2258/0283* (2013.01); *F23J 2217/20* (2013.01)

(58) Field of Classification Search
CPC ... F23J 2217/20; F23J 15/02; B01D 53/8631; B01D 53/9418; B01D 2258/0283
USPC .................................................. 422/169, 173
See application file for complete search history.

(56) References Cited

U.S. PATENT DOCUMENTS

2008/0028935 A1    2/2008   Andersson

FOREIGN PATENT DOCUMENTS

| JP | 64-28936 | 1/1989 |
|---|---|---|
| JP | 2-95415 | 4/1990 |

(Continued)

OTHER PUBLICATIONS

International Search Report mailed Dec. 27, 2011 for International application No. PCT/JP2011/077338.

*Primary Examiner* — Tom P Duong
(74) *Attorney, Agent, or Firm* — Fay Sharpe LLP

(57) ABSTRACT

An object of the present invention is to easily reduce dust having large particle diameter that affects blocking and abrasion to prevent deposition thereof in a reactor. An exhaust gas NOx removal apparatus comprises a NOx removal rector having a catalyst layer for removing nitrogen oxides in a combustion exhaust gas; a duct structure having a stab-up point at which a flow of the exhaust gas changes from a horizontal direction to a vertical direction in an exhaust gas duct on the upstream side of the NOx removal reactor; a tilt thin plate slit in which a number of thin plates are disposed in the duct of the horizontal direction of an inlet of the stub-up point or/and in an inlet of the catalyst layer in the NOx removal reactor in a vertical direction with a slit width smaller than an opening width of the catalyst layer at a predetermined inclination angle relative to the cross-section of an exhaust gas flow path; and a dust collecting/discharging portion attached to the lower end of a tilt thin plate slit.

6 Claims, 2 Drawing Sheets

1: BOILER EXHAUST GAS
2: NOx REMOVAL REACTOR
3: CATALYST LAYER
4: HOPPER OF ECONOMIZER 5
7: SCREEN PLATE
9: DUCT (STUB-UP POINT)
11, 12: HOPPER
13A, 13B: TILT THIN PLATE SLIT
14: TILT THIN PLATE

(56) References Cited

FOREIGN PATENT DOCUMENTS

| | | | |
|---|---|---|---|
| JP | 02095415 A | * | 4/1990 |
| JP | 8-290038 | | 11/1996 |
| JP | 2003-164729 | | 6/2003 |
| JP | 2009-119384 | | 6/2009 |

* cited by examiner

1: BOILER EXHAUST GAS
2: NOx REMOVAL REACTOR
3: CATALYST LAYER
4: HOPPER OF ECONOMIZER 5
7: SCREEN PLATE
9: DUCT (STUB-UP POINT)
11, 12: HOPPER
13A, 13B: TILT THIN PLATE SLIT
14: TILT THIN PLATE

V-V CROSS-SECTION

EXHAUST GAS TREATMENT APPARATUS

TECHNICAL FIELD

The present invention relates to an exhaust gas treatment apparatus, and particularly to an exhaust gas treatment apparatus for a system carrying out dry denitration of an exhaust gas containing dust using ammonia and a catalyst.

BACKGROUND ART

As a method for removing nitrogen oxides in an exhaust gas, conventionally, a method of selective reduction with ammonia using a catalyst has been mainstream. As an apparatus therefor, there is being used an apparatus for denitration reaction, in which ammonia serving as a reducing agent is introduced, together with an exhaust gas, into a reactor packed with a catalyst layer having NOx removal activity and a flow path parallel to the exhaust gas.

When dust is contained in an exhaust gas as seen in coal-fired power generation, an electric dust collector or a bag filter is generally disposed on the downstream side of a NOx removal apparatus and an air preheater for dust removal, or an electric dust collector is disposed on the upstream side of the NOx removal apparatus in some cases for dust removal. In the case of the former, since dust flows directly into the reactor, in order to prevent abrasion of a catalyst layer, a cross-section of the reactor is set to be large and a flow rate of gas flowing into the catalyst layer is set to be low. In the case of the latter, since the exhaust gas is treated under high temperature conditions, a large-scale dust remover is necessary, and although abrasion of the catalyst is remarkably reduced due to the treatment after dust removal, remaining fine dust adheres to the catalyst layer, which becomes easily blocked. Therefore, countermeasures such that an exhaust gas flow path in the catalyst layer is set to be large are taken to increase the catalyst capacity.

On the other hand, with respect to the arrangement of a duct for introducing an exhaust gas to the reactor, the following countermeasures have been taken: a duct is provided with an vertical portion relative to a flow of an exhaust gas, and thereby conveyance of relatively large dust such as massive soot is inhibited and then soot is collected and discharged using a hopper disposed in the lower portion of the vertical portion. Further, countermeasures have been taken to provide a mesh screen (a filter) such as a metal mesh in a duct of the boiler outlet to collect dust having a particle diameter larger than a mesh opening thereof. For example, Patent Document 1 discloses methods, in which a duct cross-section is provided with a mesh-shaped screen having openings smaller than the spaces of various types of catalysts (as a reference example, the pitch is 5 mm and the wire diameter is 1 mm) to remove dust; and a louver-shaped plate is disposed in a duct to cause dust having large particle diameter to collide with the duct and to fall. However, since a flow rate of an exhaust gas is about 15 m/s in a smoke path on the downstream side of an economizer of the boiler, aged deterioration due to abrasion may occur. In addition, proposed is a method, in which a mesh screen such as a metal mesh and the like is disposed in an inlet of a reactor vertically to a gas flow, and a mesh opening of the screen is adjusted to collect dust larger than a catalyst flow path. However, this method has no dust removal function, resulting in the possibility of clogging over time.

Further, Patent Document 2 describes that since dust having large particle diameter tends to be deposited on the side of a reactor of the boiler side, a mesh or a porous plate for removing dust is disposed in the lower portion of two upper vanes to remove ash. However, in this case, a gas flow tends to be non-uniform.

PRIOR ART LIST

Patent Documents

Patent Document 1: JP 2-95415 A
Patent Document 2: JP 2009-119384 A

SUMMARY OF THE INVENTION

Problems to be Resolved by the Invention

When a dust remover is disposed on the downstream side of a NOx removal reactor, it is necessary to decrease a flow rate in the reactor to prevent abrasion of a catalyst, and during a low load operation, dust tends to be deposited. Further, when a vertical duct and a hopper in the lower portion thereof are disposed on the upstream side of the NOx removal reactor, it is impossible to sufficiently reduce an exhaust gas flow rate in the duct due to limitations such as plant arrangement. Also, when it is impossible to assure a sufficient duct length, conveyance of even large dust such as massive ash is not sufficiently inhibited, resulting in massive soot larger than an exhaust gas flow path of a catalyst causing blocking in the catalyst. On the other hand, when a mesh screen is disposed in a duct, clogging becomes problematic, and also when being disposed in a duct where flow rate is large, the screen itself is abraded, resulting in frequent maintenance operations. Further, when a mesh screen is disposed in an inlet of the reactor vertically to a gas flow, no discharge mechanism of collected dust is provided and cleaning/discharging is necessary upon boiler stop. Therefore, it is possible that clogging occurs depending on a frequency of cleaning.

Objects of the present invention are to solve the above-mentioned problems, to easily reduce dust having large particle diameter affecting blocking and abrasion, and to prevent deposition in a catalyst reactor.

Means for Solving the Problems

To solve the above problems, the present inventors provided a tilt thin plate silt having a specific structure in a smoke path of the outlet of an economizer of a boiler or in the upper portion of a catalyst layer of a reactor to efficiently remove dust, whereby the above problems were solved. In other words, the invention claimed by the present application is as follows.

(1) An exhaust gas NOx removal apparatus comprising
a NOx removal rector having a catalyst layer for removing nitrogen oxides in a combustion exhaust gas;
a duct structure having a stab-up point at which a flow of the exhaust gas changes from a horizontal direction to a vertical direction in an exhaust gas duct on the upstream side of the NOx removal reactor;
a tilt thin plate slit in which a number of thin plates are disposed in the duct of the horizontal direction of an inlet of the stub-up point or/and in an inlet of the catalyst layer in the NOx removal reactor in a vertical direction with a slit width smaller than an opening width of the catalyst layer at a predetermined inclination angle relative to the cross-section of an exhaust gas flow path; and
a dust collecting/discharging portion attached to the lower end of the tilt thin plate slit.

(2) The apparatus described in (1), in which the opening width of the catalyst layer is 3 to 10 mm; the height of the tilt thin plate slit is 30 to 100 mm; and the inclination angle is 5 to 45 degrees relative to a horizontal direction.

In the present invention, the thin plate slit disposed in the duct or in the inlet of the catalyst layer is formed by arranging a plurality of thin plates, for example, a plurality of metal thin plates having a thickness of not more than 3 mm and a height of 30 to 100 mm, with a slit width smaller than an opening width of 3 to 10 mm of the catalyst layer in a vertical direction. With respect to the shape of the thin plate, those having an elongated diamond shape are used in embodiments to be described later, but any shape is employable as long as the shape can be provided in the cross-section of the exhaust gas flow path. Further, a height of the shape is selected from the range of 30 to 100 mm in view of dust collection efficiency, pressure loss, and the like.

The tilt thin plate slit is formed in such a manner that this thin plate slit is disposed in the cross-section of the exhaust gas flow path at an angle of 5 to 45 degrees with respect to a horizontal direction. When the slit width is larger than the opening width of the catalyst layer, dust is liable to be stuck in the catalyst layer. Further, when the inclination angle of the thin plate slit is less than 5 degrees with respect to the horizontal direction, only a small dust collection effect is exhibited and in the case of more than 45 degrees, abrasion of the thin plate due to dust and pressure loss are easily increased.

Advantageous Effects of the Invention

According to the present invention, it is possible to reduce dust having large particle diameter from an exhaust gas introduced to a catalyst reactor and to inhibit abrasion and blocking of a catalyst layer. The tilt thin plate slit used in the present invention is abrasion-resistant and durable more than conventional mesh screens and wire meshes (metal meshes). Further, a tilt slit structure makes it possible to efficiently collect dust in a hopper of the lower end without being caught in a falling direction. Still further, since it is unnecessary to largely decrease a flow rate of gas introduced to the catalyst layer, a decrease in dust conveyance power can be inhibited and dust deposition in the catalyst layer can be inhibited. In addition, since a dust discharging mechanism is provided, a plant can be operated regardless of cleaning of collected dust upon boiler stop.

EMBODIMENTS FOR CARRYING OUT THE INVENTION

The present invention will now be described in detail with reference to embodiments.

Figure 1:
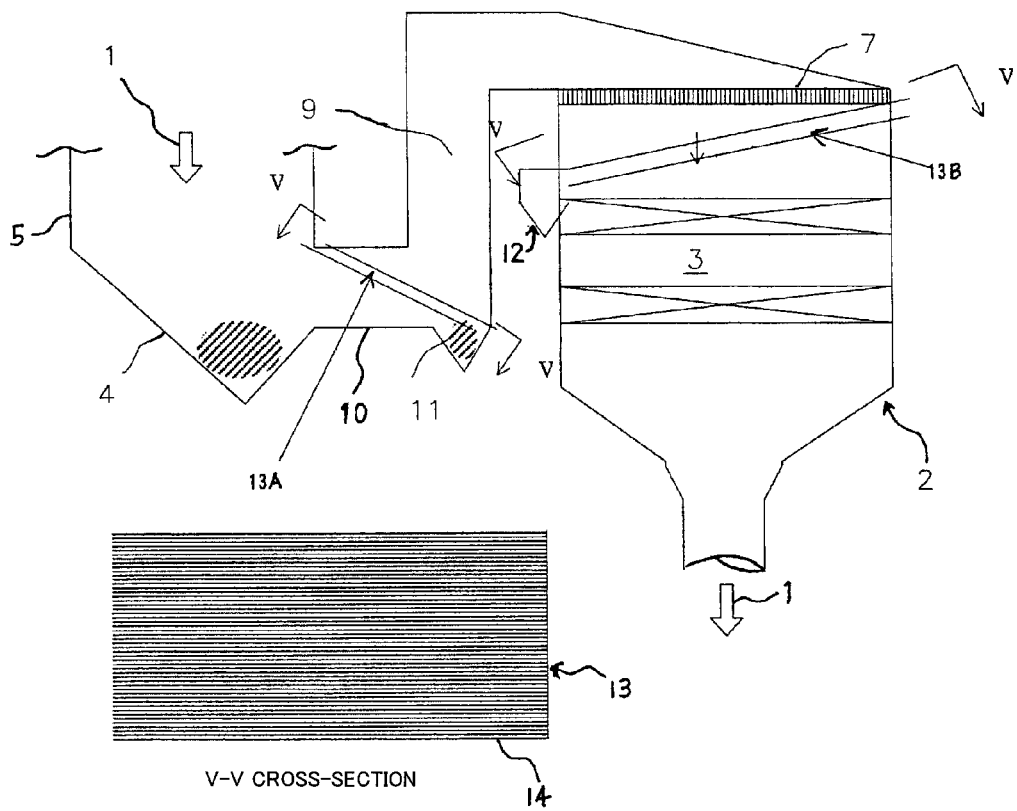
FIG. 1 is a view illustrating an exhaust gas treatment apparatus representing one embodiment of the present invention.
Figure 2:
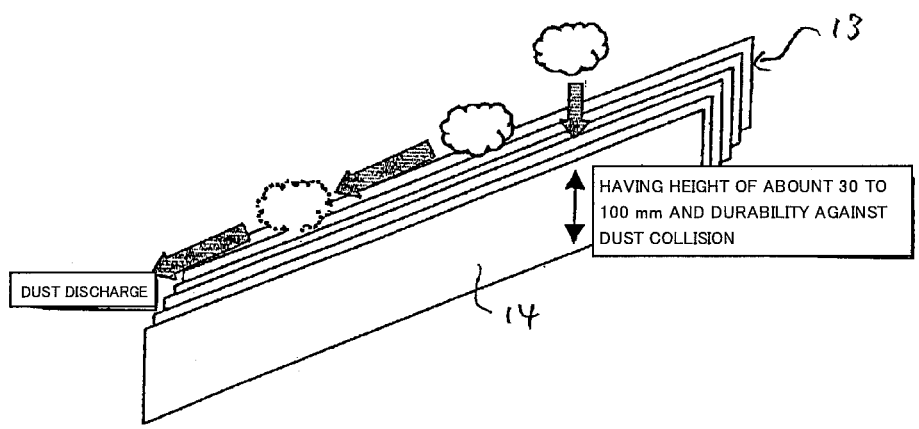
FIG. 2 is a partially schematic view of a tilt thin plate slit used in the present invention.

FIG. 1 is a view illustrating an exhaust gas treatment apparatus representing one embodiment of the present invention. FIG. 2 is a partially schematic view of a tilt thin plate slit used in the present invention. This apparatus comprises a NOx removal reactor 2 having a catalyst layer 3 for removing nitrogen oxides in a combustion exhaust gas 1 discharged from a boiler and the like; and a stub-up point 9 at which a flow of the exhaust gas changes from a horizontal direction to a vertical direction, the stub-up point 9 being disposed in a horizontal duct 10 on the upstream side of an exhaust gas inlet of the NOx removal reactor 2, in which tilt thin plate slits 13A and 13B are provided where a number of thin plates 14 having a long thin diamond shape are disposed in the duct 9 of the horizontal direction of an inlet of the stub-up point 9 and in an inlet of the catalyst layer 3 in the NOx removal reactor 2 in a vertical direction with a slit width smaller than an opening width of the catalyst layer at a predetermined inclination angle relative to the cross-section of an exhaust gas flow path; and dust collecting/discharging portions 11 and 12 are provided in the lower end of the tilt thin plate slits 13A and 13B, respectively. Herein, in the figure, the symbol 4 represents a hopper disposed in the horizontal duct of an outlet of an economizer 5, and the symbol 7 represents a screen plate disposed in an inlet of the NOx removal reactor.

In the above-mentioned apparatus, the exhaust gas 1 is sent to the NOx removal reactor 2 via a boiler outlet, a horizontal duct, a vertical duct, and a horizontal duct and treated in the catalyst layer 3. One of the tilt thin plate slits 13 is disposed in the horizontal duct of the outlet of the economizer 5 and the another of the tilt thin plate slits 13 is disposed in the inlet of the catalyst layer 3 in the reactor. Thereby, dust having large particle diameter is collected in the tilt thin plate slits 13A and 13B and then collected in the dust collecting/discharging portions provided in the lower end portions thereof, namely, the hoper 11 of the lower portion of the stub-up point 9 and the hopper 12 disposed in the side of the reactor, respectively. As a result, the flow of dust having large particle diameter into the catalyst layer is decreased and blocking of the catalyst layer is reduced.

In the above embodiment, two tilt thin plate slits (13A and 13B) were provided, but when the amount of duct in an exhaust gas is small, this slit may be disposed in either the horizontal duct of the inlet of the vertical duct 9 or in the inlet of the catalyst layer 3 in the reactor.

Herein, for comparison, in the apparatus of FIG. 1, in the case where no tilt thin plate slits 13A and 13B were provided and in the case where the vertical duct 9 was set at a common rate of 15 m/s, it was observed whether massive ash was conveyed to the reactor 2 and then dust larger than the exhaust gas flow path of a catalyst was accumulated on a catalyst layer disposed on the boiler side.

On the other hand, it was found that when a mesh screen was disposed in the boiler outlet, dust having large particle diameter enough to block the catalyst was able to be collected but dust collection partially blocked the flow path of the mesh screen and partial abrasion was observed.

EXPLANATION OF SYMBOLS

1: boiler exhaust gas;
2: NOx removal reactor;
3: catalyst layer;
4: hopper of economizer;
5,7: screen plate;
9: duct (stub-up point);
11, 12: hopper;
13A, 13B: tilt thin plate slit;
14: tilt thin plate

The invention claimed is:
1. An exhaust gas NOx removal apparatus comprising:
a NOx removal reactor having a catalyst layer for removing nitrogen oxides in a combustion exhaust gas;
a duct located upstream of the NOx removal reactor, the duct having a stub-up point at which a flow of the exhaust gas changes from a horizontal direction to a vertical direction in the duct;

a screen (13A) comprising a number of thin plates which are disposed in a plane parallel to each other to form vertical slits, a width of the slits being smaller than an opening width of the catalyst layer, the screen (13A) being located in a horizontal portion of the duct at an inlet side of the stub-up point, and the screen (13A) being tilted at a predetermined angle relative to the cross-section of an exhaust gas flow path; and a dust collecting/discharging portion (11) attached to the lower end of the screen (13A).

2. The apparatus according to claim 1, further comprising:

a screen (13B) comprising a number of thin plates which are disposed in a plane parallel to each other to form vertical slits; a width of the slits being smaller than an opening width of the catalyst layer, the screen (13B) being located in an inlet duct of the catalyst layer in the NOx removal reactor, and the screen (13B) being tilted at a predetermined angle relative to the cross-section of an exhaust gas flow path; and a dust collecting/discharging portion (12) attached to the lower end of the screen (13B).

3. The apparatus according to claim 2, wherein the opening width of the catalyst layer is 3 to 10 mm, the height of the thin plates is 30 to 100 mm, and the tilt angle of the screens (13A, 13B) is 5 to 45 degrees relative to a horizontal direction.

4. The apparatus according to claim 1, wherein the opening width of the catalyst layer is 3 to 10 mm, the height of the thin plates is 30 to 100 mm, and the tilt angle of the screen (13A) is 5 to 45 degrees relative to a horizontal direction.

5. An exhaust gas NOx removal apparatus comprising a NOx removal reactor having a catalyst layer for removing nitrogen oxides in a combustion exhaust gas;

a duct located upstream of the NOx removal reactor, the duct having a stub-up point at which a flow of the exhaust gas changes from a horizontal direction to a vertical direction in the duct;

a screen (13B) comprising a number of thin plates which are disposed in a plane parallel to each other to form vertical slits, a width of the slits being smaller than an opening width of the catalyst layer, the screen (13B) being located in an inlet duct of the catalyst layer in the NOx removal reactor, and the screen (13B) being tilted at a predetermined angle relative to the cross-section of an exhaust gas flow path; and a dust collecting/discharging portion (12) attached to the lower end of the screen (13B).

6. The apparatus according to claim 5, wherein the opening width of the catalyst layer is 3 to 10 mm, the height of the thin plates is 30 to 100 mm, and the tilt angle of the screen (13B) is 5 to 45 degrees relative to a horizontal direction.

* * * * *